Figure 1:
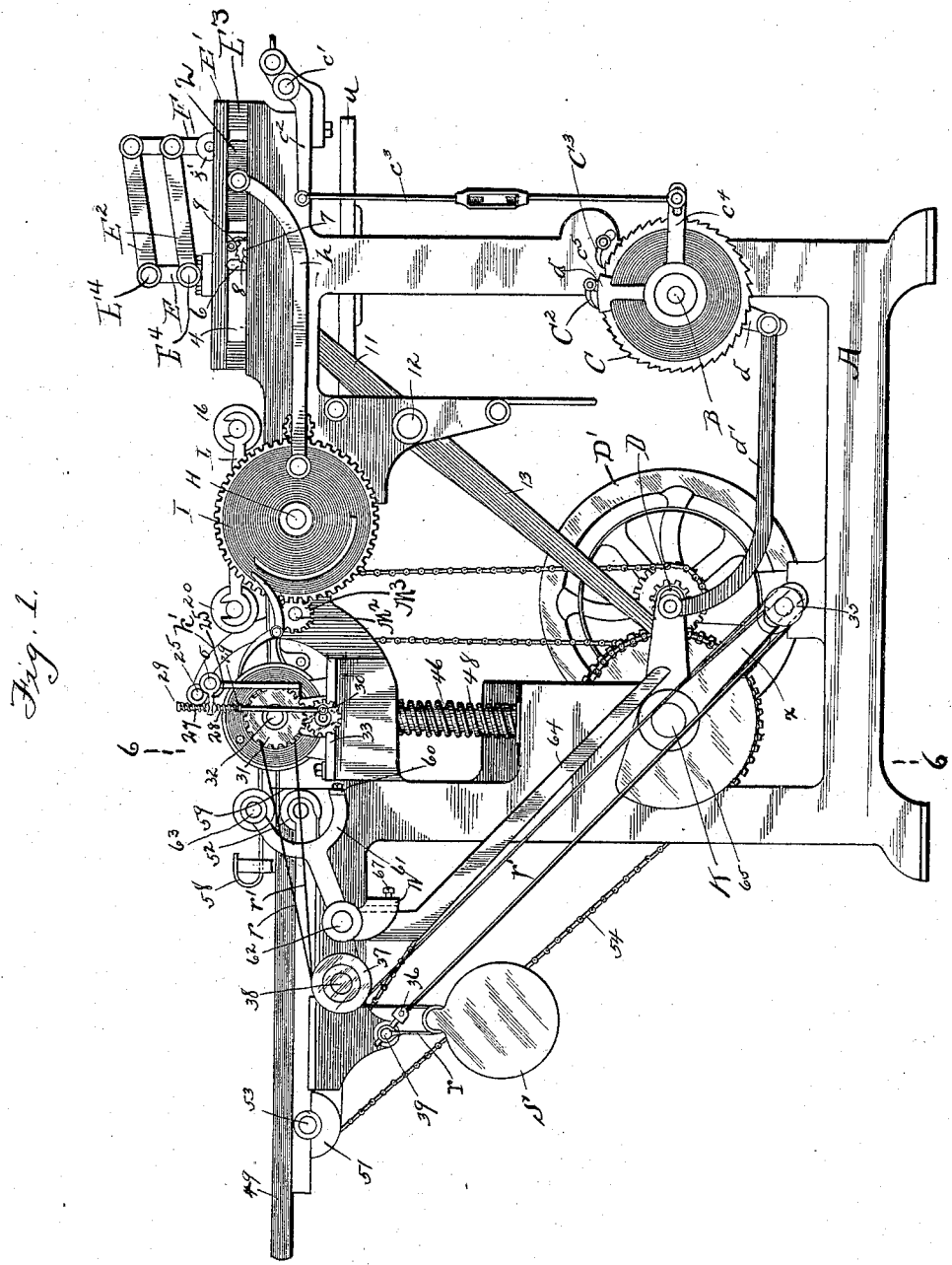

No. 726,474. PATENTED APR. 28, 1903.
T. STEBBINS.
WRAPPING MACHINE.
APPLICATION FILED APR. 5, 1897.
NO MODEL. 8 SHEETS—SHEET 1.

Witnesses:
Louis S. Thomason
Chas. J. Young

Inventor:
Timothy Stebbins
By Frank D. Thomason
Atty

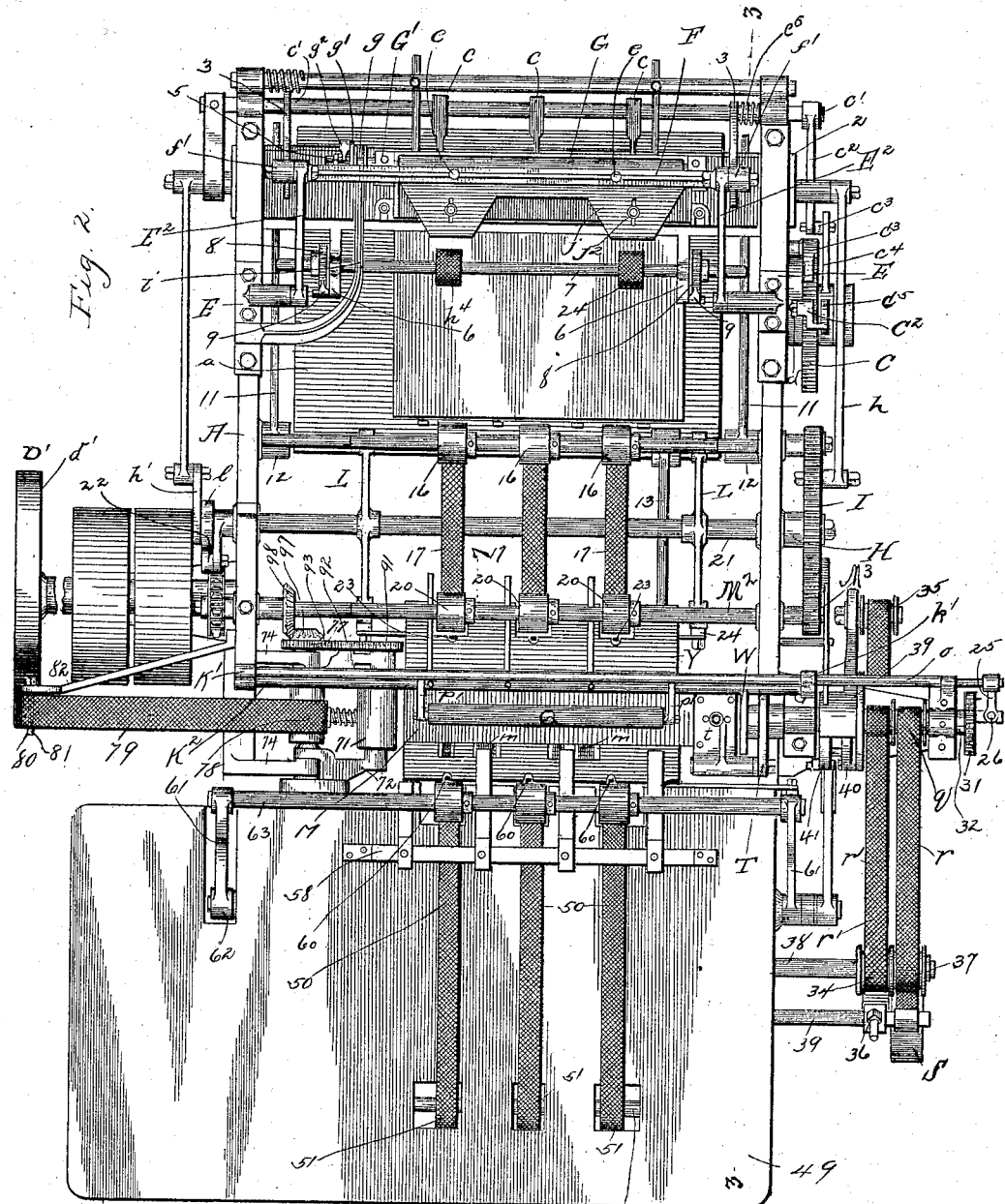

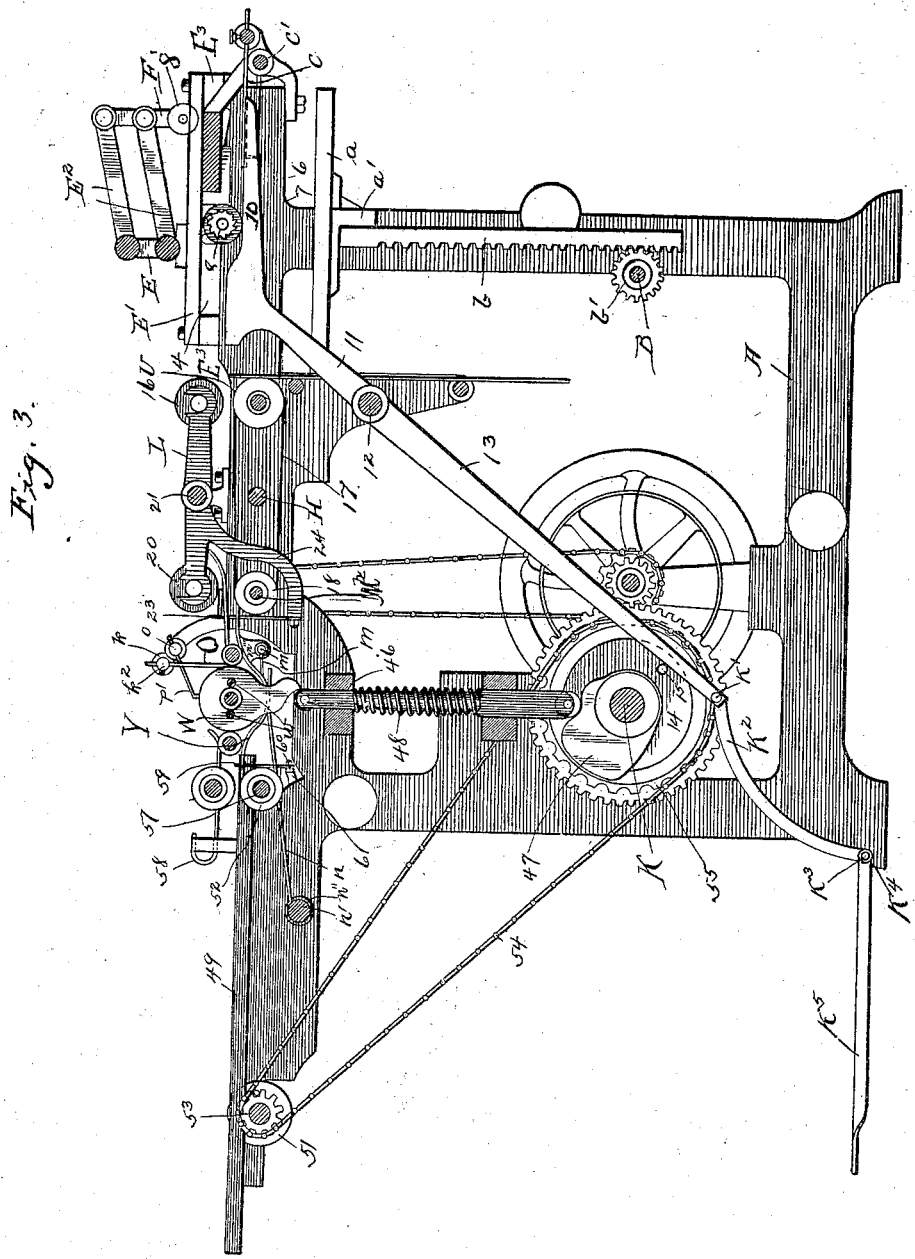

No. 726,474. PATENTED APR. 28, 1903.
T. STEBBINS.
WRAPPING MACHINE.
APPLICATION FILED APR. 5, 1897.
NO MODEL. 8 SHEETS—SHEET 4.
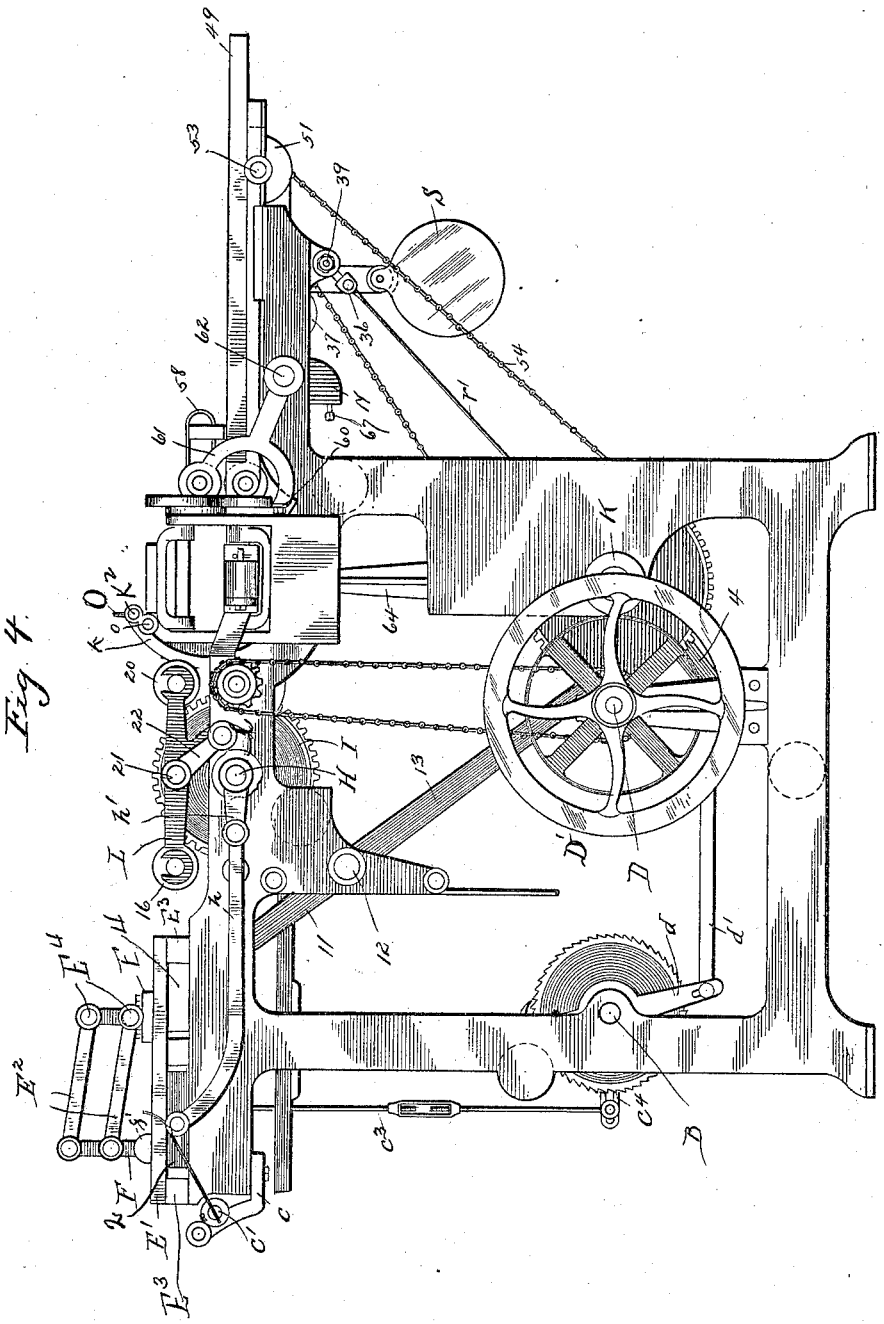

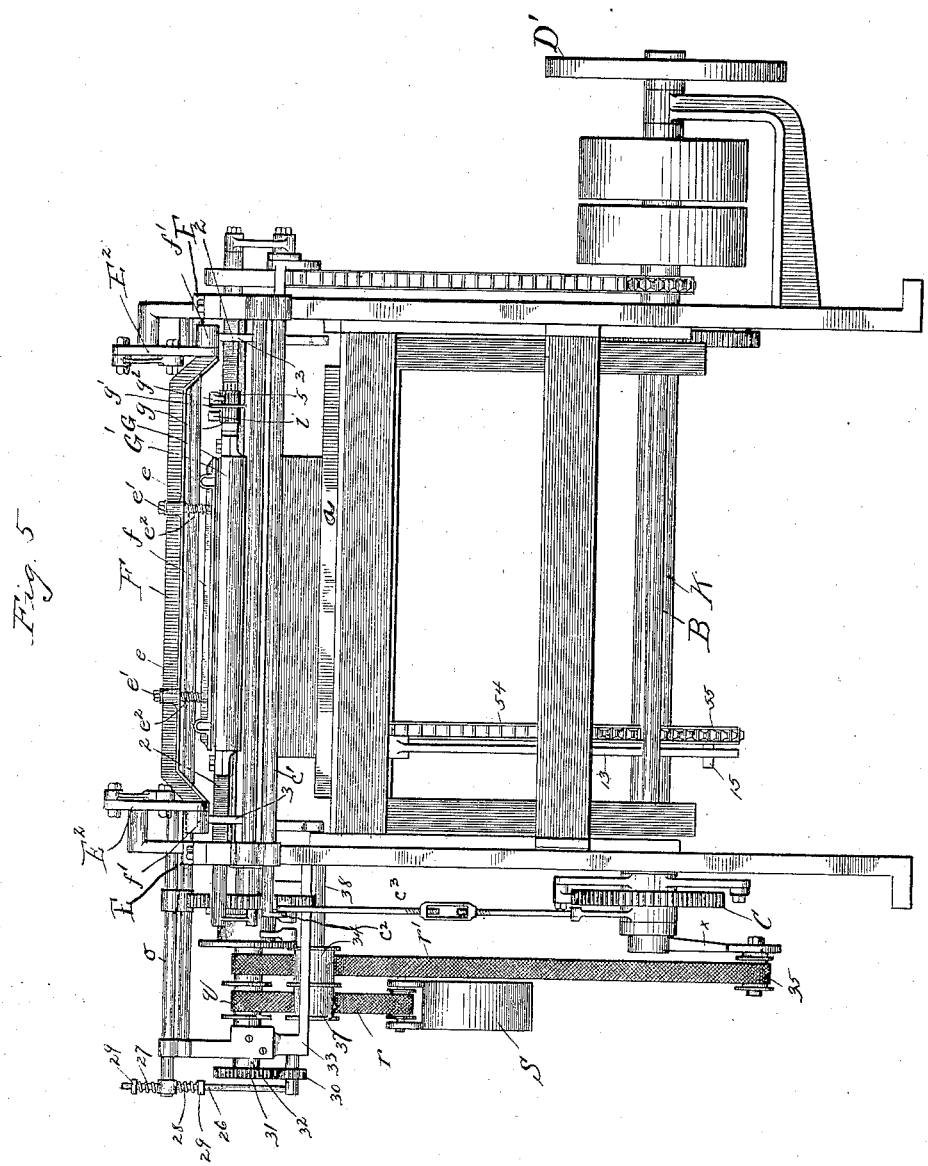

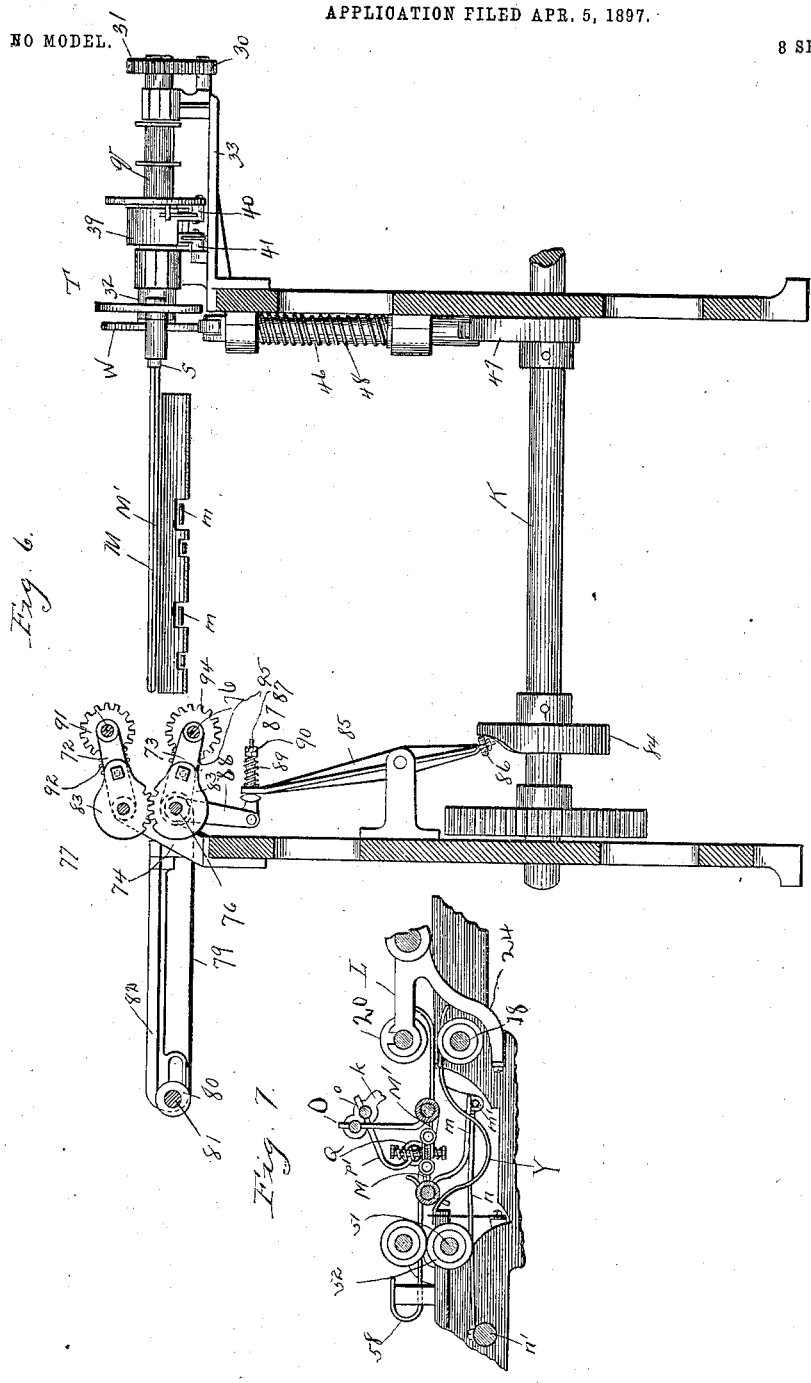

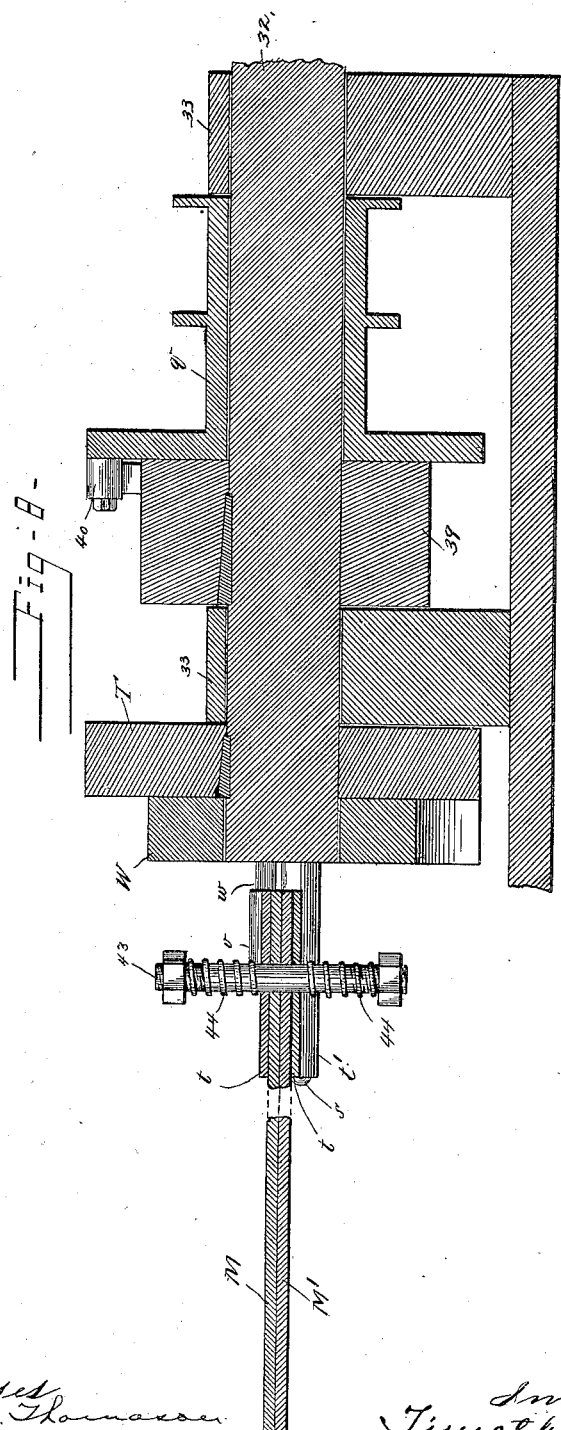

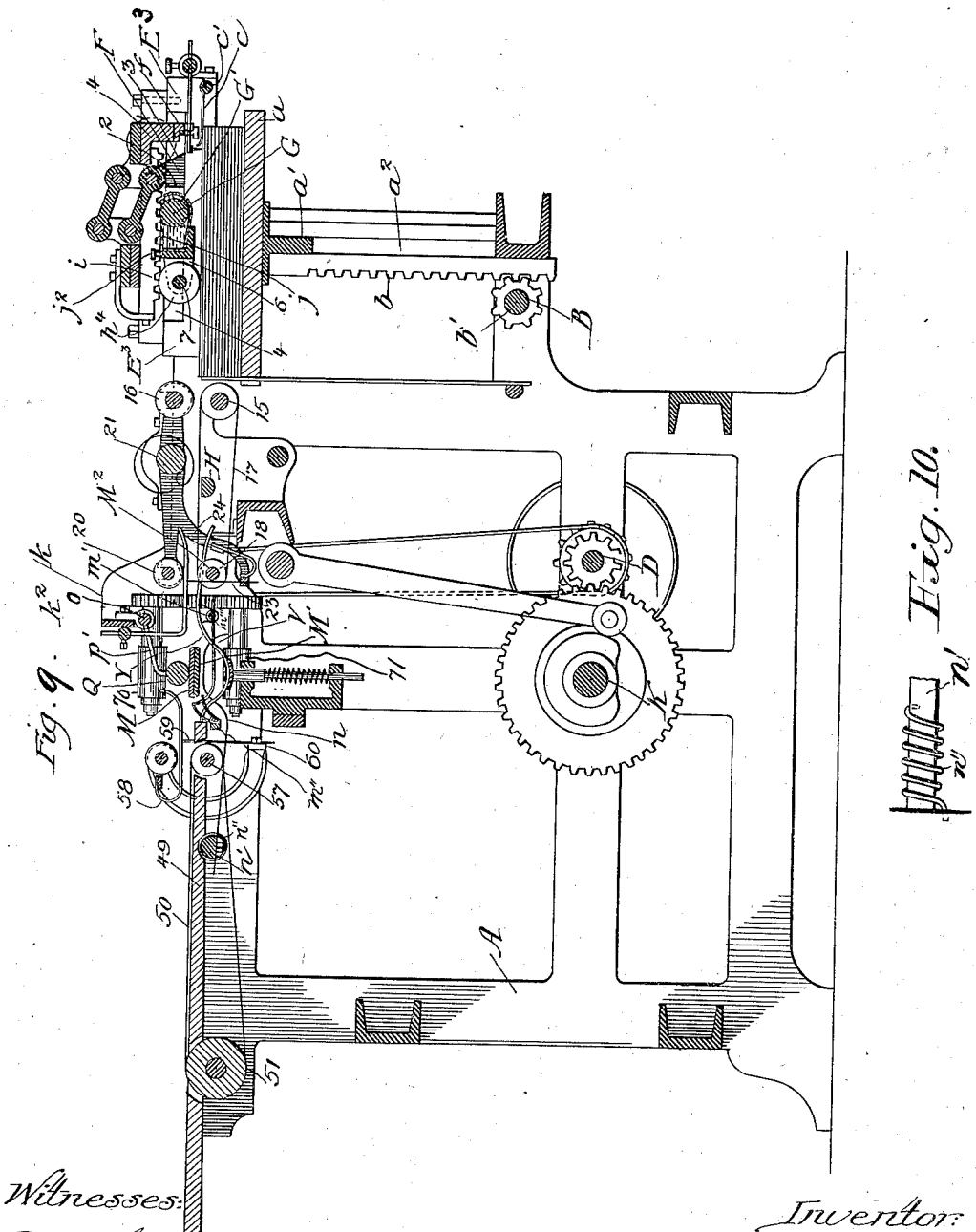

UNITED STATES PATENT OFFICE.

TIMOTHY STEBBINS, OF DAVENPORT, IOWA, ASSIGNOR TO RED JACKET MANUFACTURING COMPANY, OF DAVENPORT, IOWA, A CORPORATION OF IOWA.

WRAPPING-MACHINE.

SPECIFICATION forming part of Letters Patent No. 726,474, dated April 28, 1903.

Application filed April 5, 1897. Serial No. 630,909. (No model.)

*To all whom it may concern:*

Be it known that I, TIMOTHY STEBBINS, of Davenport, in the county of Scott and State of Iowa, have invented certain new and useful Improvements in Wrapping-Machines, of which the following is a full, clear, and exact description, reference being had to the accompanying drawings and to the letters and numerals of reference marked thereon.

My invention relates more particularly to the wrapping of newspapers and magazines for mailing. This is accomplished quickly and neatly in a manner which is just the reverse of the method employed when wrapping by hand. When wrapping newspapers and magazines by hand in large publishing establishments, especially where the employment of my improved machine would be beneficial, the pile of wrappers is spread so as to leave the margins of each wrapper along one side edge exposed. These margins are moistened with paste, and then the folded newspapers are placed upon and rolled up in the wrapper, so that the paste-moistened margin of the wrapper comes in contact with and adheres to the outer surface thereof. By my process the wrappers are placed in a perfectly upright pile, with their edges in the same vertical plane, and are provided with a narrow layer of paste one by one by a paste-covered pressure-foot. The paper or magazine is placed by hand on tapes, which carry the same to gripping-blades. These gripping-blades revolve together and wind the paper around them, and at the proper time the adjacent forward edge of the wrapper is caught in the fold of the paper and is wrapped around the same until its paste-moistened edge is made to adhere to the outer lap thereof, whereupon the wrapped newspaper is automatically stripped in a lengthwise direction off said blades. The whole process as performed by my improved machine is automatic, excepting the placing of the paper or magazine on the feed devices, and the labor to do this can readily be performed by inexperienced hands. The rapidity with which the machine does its work is only limited by the character of the material operated upon and expertness of the operator and will enable large publishers particularly to prepare and mail their publications with greater punctuality and with less trouble and expense than heretofore.

In the drawings, Figure 1 is a side elevation of my invention. Fig. 2 is a plan view of the same. Fig. 3 is a longitudinal vertical section on the plane indicated by the dotted lines 3 3, Fig. 2. Fig. 4 is a side elevation of the machine looking at it from the side opposite to that shown in Fig. 1. Fig. 5 is a rear end elevation of my invention. Fig. 6 is a transverse vertical section taken on dotted line 6 6, Fig. 1. Fig. 7 is a longitudinal vertical section through the gripping-blades and conjunctive mechanism, taken on dotted lines 7 7, Fig. 2, and broken away or separated from the rest of the machine. Fig. 8 is a longitudinal section through the gripping-blades and their supporting and actuating mechanism detached from the rest of the machine. Fig. 9 is a longitudinal central vertical sectional view. Fig. 10 is a detail view showing the spring-returned shaft $n'$.

In the drawings, A represents a suitable supporting-frame, in which the movable parts are assembled and journaled and immovably or movably retained. Between the sides and in the upper portion of the rear of this frame A is a platform $a$, preferably of oblong shape, which is supported by and secured to a suitable cross-head $a'$, the ends of which latter enter and are movable vertically in suitable vertical guideways $a^2$ in uprights forming part of frame A. The wrappers are piled upon a platform $a$, and as the pile of wrappers becomes smaller this platform automatically rises, so as always to keep the top of the pile on the same plane. This is accomplished by means of a vertical rack $b$, secured to its upper end about the center of length of the cross-head $a'$ and depending down therefrom and intermeshing with a pinion $b'$ on the transverse shaft B. Shaft B is given an intermittent movement, which is regulated by devices that are controlled by the height of the pile of wrappers. These devices consist of a series of adjustable fingers $c$, that project forward (laterally) from a transverse rock-shaft $c'$, which is journaled in brackets projecting from the rearmost upper horizontal portion of frame A, and one end of this rock-shaft $c'$ extends through its bearings and has an arm $c^2$ projecting from it. Arm $c^2$ is connected by a rod $c^3$ to the horizontal branch of a bell-crank $c^4$ and the end of the vertical branch of which is provided with a head $c^5$, the upper edge of which is curved to describe a segment struck from the center of shaft B. This bell-crank is loose on the end of shaft B, and the radius of the curved edge of the head $c^5$ of its vertical branch is slightly greater than that of the ratchet C, mounted next to it on said shaft. Ratchet C is engaged by a pawl $C^3$, journaled on a stud projecting from the side of the supporting-frame A, and is prevented thereby from moving backward, so as to lower the platform $a$, and said ratchet is intermittently engaged by a pawl $C^2$, pivotally secured to the end of an oscillating arm $d$ in constant motion during the operation of the machine. Fingers $c$ are kept bearing upon the pile of wrappers by a coil-spring $c^6$, surrounding one end of the shaft $c'$, one end of said spring being secured in the supporting-frame and the other end to the shaft. Now when said fingers are inclined downward at a certain angle because of the decrease of the size of the pile of wrappers the shaft $c'$ and the arm $c^2$ will have moved, so that the rod $c^3$ will have caused the segment $c^5$ to move out of the way and permit the pawl $C^2$ to engage ratchet C and turn it in such direction that through shaft B and rack $b$ platform $a$ is raised until the top of the pile of wrappers has resumed the proper plane. When this is done, fingers $c$ being raised cause rod $c^3$ to move upward and move the segment back under the pawl $C^2$ again.

The oscillating lever $d$, carrying pawl $C^2$, is fulcrumed on shaft B, and is actuated by a rod $d'$, the opposite end of which is eccentrically connected to the end of the transversely-arranged drive-shaft D, which is driven by belt-and-pulley connection with the main shaft, and has a fly-wheel D' on its end opposite rod $d'$.

E represents two corresponding standards, which are located on each side of the machine in transverse alinement and consist of a base-flange, suitably secured to the longitudinal bars E', so as to be in about the same transverse vertical plane as the rack $b$, and have a vertical portion arising from said flanges, from which two corresponding bosses or lugs $E^4$ project, one immediately above the other, toward the center of the machine. To these studs the forward ends of the parallel links $E^2$ are articulated, which latter have their ends pivotally connected to the vertical lugs made integral with the ends of the paster-head F. This paster-head is preferably a transverse arched T-iron, and it has the paster-foot $f$ secured to and depending from it so as to be adjustable vertically, as fully shown in Fig. 5. This paster-foot consists of a bar of metal, broadened as it approaches its lower edge, which latter is flattened, so as to take paste from the paster-roller G, as will hereinafter be more fully explained, and it is suspended from head F by means of bolts $e$ $e$, which project therefrom up through suitable vertical openings in said head, with adjusting-nuts $e'$ on their upper threaded ends and coil-springs $e^2$ surrounding them between said head and the paster-foot, which keeps said foot normally pressing downward. At the lower extremity or angle of the vertical ends of the paster-head are the travelers $f'$, suitably journaled thereto, which during the operation of the machine roll upon the trams 3 3, connected to the reciprocal paste-fountain carrier, which will hereinafter be more fully described, and as they roll down the inclined rear portion of the tread of said trams let the paster-foot and head gravitate down to and then on the wedge principle raise the same from the pile of papers on the platform $a$.

The paste-roller G is journaled in end walls of the paste-trough G', and one of its journals extends beyond its bearings and has a spur-wheel $g$ thereon, through the medium of which it derives motion, as will hereinafter more fully appear. This paste-roller is supported on and secured to a truck 2, which extends to and has its ends movable in the guideways 4, made between the upper edge of the rear portion of the sides of the frame A and the longitudinal bars E', the ends of which latter rest on and are secured to the end blocks $E^3$, which constitute the limits of said guideways 4, as shown. This truck is reciprocated by connecting-rods $h$ $h$, pivotally connected to its ends outside of the machine-frame A and actuated by a crank $h'$ and a gear I, to which they are connected, and which are mounted on the ends of a transverse shaft H. Secured to the truck 2 near its ends are the trams 3 3, hereinbefore referred to, upon which travelers $f'$ run, and during the forward throw of said truck roll down the rear inclined portion of its tread to lower the paster-foot to such a plane that it comes in contact with and applies paste to the rear edge portion of the top sheets of paper resting on platform $a$, so that subsequently when said sheets are fed to the folding-blades and rolled around the folded newspaper it will cement onto itself and complete the wrapping of the paper.

In order to revolve the paste-roller G, I extend one of its journals through its bearings and loosely mount thereon the spur-wheel $g$, before alluded to, and to the side of this spur-wheel secure a disk $g'$. This disk carries a spring-controlled pawl $g^2$, which engages a ratchet 5, made fast to the extended journal of the paste-roller, and as the paste-fountain moves backward said pawl slips over the teeth of the ratchet, and when it moves forward engages said ratchet and imparts the motion of the spur-wheel thereto and revolves the paste-roller in the proper direction. The spur-wheel derives motion from an overhead rack $i$, the portion of which engaged by said spur-wheel extending longitudinally and at right angles to said paste-roller, and the forward portion thereof being curved and terminating in a plate, which is secured to the longitudinal bar E' on the adjacent side of the machine just forward of the standard E.

The paste-fountain is provided with a scraping-plate or doctor $j$ to prevent too thick a film of paste getting on the paste-roller. This doctor consists of a plate having a straight sharp edge placed next and parallel to the paste-roller and having two or more transversely-elongated openings therein, up through which thumb-screws $j^2$ project. This doctor is placed over the fountain in front of the paste-roller and is adjusted so as to move the rear straight edge to within proper distance of the paste-roller, whereupon it is held in such adjusted position by tightening the thumb-screws.

Journaled in the open bearings in suitable lugs 6 6, projecting forward from the forward edge of the paste-fountain or from the forward surface of the upturned flange of the forward edge of the truck 2, is a transverse shaft 7. Immediately in front of the paste-fountain and over platform $a$ this shaft is provided with two or more rubber-faced friction-rollers $h^4$, and on its ends, which extend beyond its bearings a corresponding distance, this shaft 7 next said bearings is provided with ratchets 8 8, that are engaged by pawls 9, pivoted to lugs 6, that prevent said shaft revolving as the paste-fountain moves forward, but permit the free revolution thereof as said fountain moves backward.

As stated, the ends of the shaft 7 extend beyond their bearings. Near their ends they (or wheels secured thereto) normally rest and travel on the upper edges of the upper horizontally-disposed portions 10 of the arms 11, projecting upwardly and rearwardly from the rock-shaft 12, next the side frames A, in which said rock-shaft has its bearings. The general direction pursued by these arms 11 describes an inverted obtuse angle. Commencing from their rear extremities the upper edges of the greater part of portion 10 of these arms when they are raised to the limit of their upward movement are horizontal. Near the forward end of these said portions 10 their upper edges curve upward to and terminate in a higher horizontal plane, as shown.

Projecting from rock-shaft 12 diametrically opposite arm 11 is an arm 13, which extends obliquely downward toward the front of the machine and terminates at a point below a transverse shaft K, where its extremity is provided with a lateral pin K', which is engaged by the end of a curved arm $K^2$, projecting from a pedal-shaft $K^3$. The pedal-shaft is normally in the position shown in Fig. 3 by virtue of a torsional coil-spring $K^4$ thereon, so that arm $K^2$ will be below the extremity of arm 13, and only when pedal $K^5$, projecting forward from shaft $K^3$, is depressed will the curved arm $K^2$ engage arm 13. When not so engaged, arm 13 is engaged and moved so as to raise arms 11 once during every revolution of sprocket-wheel 14 by a lateral stud 15, projecting from said wheel. Now the movement of arms 11 is such that when the paste-fountain moves forward said arms will be at the limit of their downward throw and the friction-rollers will be in contact with and move forward on the pile of wrappers on platform $a$, and as shaft 7 by reason of the pawls 9 and ratchets 8 is locked from rotation during this forward movement of the paste-fountain said rollers do not revolve, but push or brush the surface sheet or wrapper to and between the series of tape-rollers U and then lift off the same as the extended journals of shaft 7 slide up the upward incline of the forward edges of portion 10 of arms 11, so that the pasted rear edge of the wrapper will not come in contact with the rollers $h^4$. When the paste-fountain moves rearward, shaft 7 is free to revolve as its ends roll on the upper edges of the engaged portion of arms 11, and the friction-rollers $h^4$ while arms 11 are at the limit of their upward throw simply roll over the wrappers should they come in contact therewith. Roller U is connected by suitable tapes 17 to rollers 18 and located in the same horizontal plane nearer the front of the machine and so that the plane of the upper stretch of tape connecting them will be the same as that of the surface-wrapper on platform $a$, and the shafts of both these series of tape-rollers U and 18 are journaled in suitable bearings in the sides of the machine-frame A. The shaft $M^2$ of the tape-rollers 18 extends through its bearings on the side adjacent to the drive-pulley and is driven by means of suitable sprockets and an endless chain or otherwise from the drive-shaft.

The shaft on which the series of idle rollers 16 are mounted is journaled above and in the same vertical plane as rollers U in the open bearings in the rear ends of the rear branches of the rocking beams L. In the corresponding forward branches of said beams there is a similar shaft with a similar series of idle rollers 20, likewise journaled in open bearings, so as to come above and in the same vertical plane as rollers 18. The fulcrumal shaft 21 for these rocking beams is suitably journaled in bearings secured to the top edges of the sides of frame A, and one end of this shaft extends beyond its bearings and has a downwardly-projecting arm 22 thereon, which has an antifriction-roller journaled to its end that is always kept bearing upon the periphery of a cam $l$ on the adjacent extended end of shaft H by means of a torsional spring or otherwise. This shaft H is driven by means of a pinion $M^3$ on the end of the shaft $M^2$ and engaging gear I, and the cam $l$ on its end is of such peripheral shape that it causes the rocking beams L to move so as to lower the rollers 16 until they bear upon rollers U just as the surface-wrapper is being moved forward by the friction-rollers $h^4$ on shaft 7 during the forward movement of the paste-fountain. Rollers U and 16 remain in contact or rather bearing against each other until the wrapper is moved forward between them until just before the sheet is intercepted by the stop-fingers 23, which are adjustably secured to the forward extremities of the downwardly-extending brackets 24, depending down from the forward branches of the rocking beams. These stop-fingers when the rollers 16 are lowered to engage with tape-rollers U are raised so as to stop the forward motion of the sheet of wrapping-paper; but when the forward branches of said beams are lowered rollers 20 engage with tape-rollers 18 and stop-fingers 23 move down out of the path of the wrapper, which is fed forward between said rollers 18 and 20 to the gripping devices, as will hereinafter more fully appear.

In order to support the wrapper as it leaves the tapes and direct it to the gripper-blades M and M', I have provided a shield Y, the forward edges of which are secured to the rear edges of the feed-table 49, from whence it dips downward and then curves upward and to the rear of the shaft $M^2$ of the tape-rollers 18, which its rear portion is recessed or cut away to accommodate. Thus constructed it forms a trough for the transversely-arranged gripping-blades to revolve in, the walls of which press up against the paper manipulated by said grippers during the operation of the machine and confine the loose edges of the paper and the wrapper as they are being folded and wrapped. The shield Y is assisted in this respect by other devices, that will be referred to presently. One of these consists of a series of spring-arms $m$, the rear ends of which are suitably secured to a rock-shaft $m'$, actuated by a spring $m'''$, said rock-shaft being located immediately to the rear of the trough of said shield and under the rear portion of the same. This rock-shaft $m'$ has its ends journaled in lugs secured to and depending down from the under side of said shield, and the arms $m$ project forward therefrom, up through slots in said trough, and follow an upwardly-curved course to the opposite side of the trough of the shield to a plane a little below that of the center of revolution of the blades, where their forward end portions are bent downward and extend back through said slots and preferably have their ends connected by a transverse bar $m$. Another set of devices that I employ to assist in confining and directing the paper and wrapper during their manipulation by the gripper-blades consist of a series of arms $n$, the forward ends of which are suitably secured to a transverse rock-shaft $n'$, returnable by a spring $n''$, said rock-shaft being suitably journaled under the rear portion of the feed-table. These arms extend longitudinally past the rear edge of the feed-table and through slotted openings in the bottom of the trough of the shield Y and out again and beyond the same.

In addition to these series of arms $m$ and $n$ I provide a tamping-roller Q, which is above the grippers and is journaled in the ends of arms $p'$, projecting from a rock-shaft $o$, which in turn is journaled in the standards $k$ $k'$, secured to the sides of the supporting-frame A. Roller Q normally rests and rides upon the gripping-blades and its pressure thereon is such that besides contributing to confine the paper and wrapper while being manipulated by the grippers they assist the lapping and cementing of the pasted end of the wrapper onto itself, so as to complete the wrapping operation of the machine. Rock-shaft $o$ extends beyonds its bearings in standard $k$, where it is provided with a forwardly-projecting arm 25, which has a vertical bolt 26 passing loosely through a slightly-elongated opening near its end. This bolt has coil-springs 27 and 28 surrounding it both above and below said arm 25, which are confined and the pressure of which against the arm is regulated by suitable nuts 29, as shown. The lower end of bolt 26 is eccentrically connected to an idle pinion 30, which revolves twice as fast as the grippers and as it revolves causes the said bolt to reciprocate shaft $o$ to rock and roller Q to rise and fall and bear constantly with substantially the same degree of pressure against the paper and wrapper being folded and wrapped all the time, while at the same time adjusting itself to the thickness of the work on the grippers. There is secured to the standards $k$ $k'$, above the bearings of the rock-shaft, a transverse stationary bar $k^2$, to which are secured a series of vertically-adjustable L-shaped fingers $o$, the horizontal part of which comes above the path of the wrapper as it is advanced to the grippers and extends to the rear of and between roller 20 and tape-roller 18 on such a plane as to prevent the wrapper from flying upward. The idle pinion 30 is engaged by a gear 31 on the outer end of the reversible shaft 32, which is journaled in suitable bearings secured to the outer and inner ends of a bracket 33. Revolving loosely on this shaft 32 between its bearings and next the outer bearing is a double spool $q$, the flange on the end of which farthest from the outer bearing is greater in diameter than the central and opposite end flange. The end portion of the spool between the central and outer flanges thereof has a strap $r$, of suitable material, wound thereon in such manner that it winds onto and unwinds from the uppermost segment of said outer division of the spool, and the inner portion of the spool has a similar strap $r'$ wound thereon in the opposite direction from strap $r$, or, in other words, so that it winds and unwinds from the lowest segment of the inner division of the spool. It will thus be observed that when strap $r$ winds upon its spool strap $r'$ unwinds, and vice versa. Strap $r'$ extends in a horizontal direction forward to near the center of length of the feed-table, where passing around an idle sheave 34 it pursues a downward course to and around a sheave 35, journaled on a suitable shaft projecting from crank $x$ on the adjacent extended end of the transverse shaft K, and from thence it extends back to and has its end fastened in the head of a longitudinally-adjustable anchor-bolt 36. Strap $r$ extends from its portion of spool $q$ to and around a sheave 37, placed alongside of sheave 34 and journaled on the same spindle 38, projecting laterally from the side of the supporting-frame A, and then said strap $r$ extends down around the pulley to the top of the weight S and then up to the same lateral arm 39 that the anchor-bolt is supported by and around the outer end of which said strap $r$ is fastened. Thus as shaft K revolves the diameter of the periphery described by the sheave 35 on crank $x$ is such that it causes strap $r$ to unwind from spool $q$ during half its revolution and in so doing turn the spool from right to left and then slacks the said strap $r$ during the other half of its revolution, so that it rewinds upon its portion of the spool by reason of the same revolving from left to right. This left-to-right motion of the spool is caused by the weight S pulling down upon and causing strap $r$ to unwind. On shaft 32 next the innermost flange of the spool I permanently secure thereto a suitable clutch 39, consisting of a collar having just one longitudinal groove in its circumference, one side wall of which is cut on a radial plane. This clutch when spool $q$ revolves from left to right is engaged by a pawl 40, journaled to the inner large flange of said spool, and is carried with it and causes shaft 32 to revolve; but when spool $q$ revolves from right to left pawl 40 slips past the groove in said clutch, which latter, however, is prevented from revolving in the opposite direction and is held stationary in a given position by a spring-controlled pawl 41, which is pivoted to a lug arising from bracket 33 and which catches in said groove. Shaft 32 extends through its inner bearings and next the side thereof opposite the clutch has made fast thereto the head T, to which the gripper-blades are pivotally attached and from which they derive their revolving motion. In order to thus pivotally attach the gripper-blades to head T, I provide the same at points located diametrically opposite and at equal distances from the center of revolution thereof with two corresponding pintles $s\ s$. These project parallel to each other and to the direction of length of shaft 32 and have the knuckles $t'\ t'$ of plates $t\ t$ journaled thereon. The knuckles $t'\ t'$ are longer than the width of the plates $t$, and said knuckles therefore extend beyond the edges of said plates toward the head T, and thus create a space between said plates and head which is occupied by a cam W, loose on the inner end of shaft 32. This cam is of the shape hereinafter described, and it has projecting from points diametrically opposite each other the studs $w\ w$, one of which enters a socket $v$ in the adjacent edge of one plate $t$ near its side farthest from its knuckle $t'$, and the other stud enters a corresponding socket $v$ in the other plate similarly located.

The gripper-blades M and M' are of a width a little less than the length of plates $t$ and are fastened thereto at one end in such position that their edges when brought together are bounded by the same planes and so that they come flatwise together. These blades extend toward the opposite side of the machine in alinement with shaft 32 and terminate a distance therefrom corresponding to about one-third of the distance between the sides of frame A. Blades M M' are held flatwise together or pressing toward each other by means of a bolt 43, passing at right angles through suitable openings therein, and plates $t\ t$ and springs 44 surrounding the projecting ends of said bolt and nuts 45 for regulating the pressure of said springs on said plates $t$, as shown.

The papers folded to a quarto fold or the magazines to be wrapped are placed one at a time on the feed-table and fed by machinery to the gripping-blades, which at the proper time and while in a horizontal position separate or open, but with their broad surfaces always parallel, to receive the advancing edges of the paper or publication. They then close together, pinching and holding the forward edge of the work between them, and then revolve to fold the same. Just before the final lap of the work is made, however, the forward edge of the wrapper, whose advance, as we have seen, is properly regulated, is inserted under the said lap and as the grippers are revolved is wrapped around the work until its rear pasted edge laps against itself and is cemented thereto. When this is done and the gripper-blades are again brought to a standstill in a stationary position, the said blades are separated slightly while the folded and wrapped work is being stripped longitudinally off the unattached ends of said blades, whereupon said blades are again opened to receive the next paper. This opening of the blades M M' is accomplished by the cam W, the principal part of the periphery of which is round and the remaining part of which when the said grippers are brought to a standstill projects downward like the tail of a comma. This tail part is met by the upper end of a vertically-reciprocal push-bar 46 just about the time shaft 32 ceases to be actuated by the spool and stopped, and then as said bar continues to move upward the cam is moved independently of shaft 32 thereby, and the cam through the action of studs $w$ on plates $t$, separates plates $t$. The lower end of bar 46, as likewise its upper end, is provided with a traveler and rests on the periphery of a cam 47 on shaft K, and the peripheral formation of this latter cam is such that about the time the paper enters between the open gripper-blades the coil expansion-spring 48, surrounding said bar between its bearings, forces it downward out of the way of the cam W and then after the paper is wrapped pushes it up again, so as to cause said blades to open slightly, and finally pushes it still farther up to cause the maximum separation or opening of said blades at the proper time.

The publications to be operated upon by my machine are, if they are newspapers, first given a quarto fold and are fed to the grippers from the front of the machine. This requires a feed-board 49 of suitable dimensions, over the upper surface of which is a series of endless tapes 50 50, that travel longitudinally around and connect the tape-rollers 51 52. The tape rollers or wheels 51 are attached to a transverse shaft 53, which is journaled in suitable bearings depending from the under side of the feed-board, near the forward edge thereof, and which is driven by means of a sprocket-wheel thereon between its bearings and an endless chain belt 54 from a sprocket 55 on the cam-shaft K. The tape-rollers 52 are fixedly mounted upon a transverse shaft 57, journaled in suitable hangers depending from the under side of the feed-board 49, near the rear edge thereof. Feed-board 49 is also provided with the usual longitudinally-disposed and transversely-adjustable gage-bars 58 for preventing the lateral displacement of and for directing the work of the grippers.

When the papers or publications to be wrapped are fed one at a time to the machine, they are carried by the tapes 50 toward the grippers; but when they reach the rear edge of said board 49 they are stopped by the gage-fingers 59. These fingers are connected at their lower ends to a cross-bar 60, which is carried by and the ends of which are secured to the extremities of the lower branch of the crescent-shaped end of the arms 61, mounted on the ends of a transverse rock-shaft 62, journaled in the sides of the machine-frame A and passing under the feed-board. An idle shaft 63, having a series of rollers thereon, has its ends journaled in the extremities of the upper branches of the crescent-shaped ends of arms 61, and the relative position of the upper ends of fingers 59 and said shaft 63 is such that when arms 61 are at the limit of their downward movement the rollers on shaft 63 will engage rollers 52, and when said arms 61 are at the limit of their upward movement said fingers are elevated in front of and stop the advance movement of the work. Shaft 62 is actuated by means of a lever 64, loosely fulcrumed on its end and which a short distance below said shaft extends obliquely to and over the cam-shaft K and is engaged by a suitable sector-shaped cam 65. Lever 64 engages a short segmental arm 66, fast to and depending down from the end of shaft 62, and has a lateral offset or lug N, through which a gage-screw 67 is tapped that impinged against lever 64. This method of connection between lever 64 and shaft 62 is adopted so that should an extra thickness of work pass between the tape-rollers 52 and the idle rollers on shaft 63 the latter can yield to accommodate it. In addition to this the rollers on said idle shaft and the gage-fingers can by properly manipulating the gage-screw 67 be adjusted with relation to tape-rollers 52 so as to obtain the objects for which they are made to the best advantage and so as to hold and then release the advancing paper just at the time when the flat surfaces of the gripper-blades are in a horizontal position and are separated sufficiently to receive the advanced edge of the same. After the gripper-blades have caught hold of the advanced edge of the paper and revolved, so as to wrap it around them, and while so doing have caught the forward edge of the sheet of wrapping-paper fed thereto from the rear of the machine and have caused said wrapper to wind or wrap around the paper until its pasted edge is cemented to the lap next thereto, then when the package is complete the blades come to a stop, with their broad sides in a horizontal plane, and separated slightly, two parallel continuously-revolving horizontal rollers 70 and 71, located next the unsecured end of and arranged at right angles to the length of said gripper-blades, are moved, respectively, upward and downward toward each other and catch the end of the wrapped package extending beyond the ends of the blades between them and draw the same lengthwise off the gripper-blades quickly and so as not to interfere with the further action of said grippers. These rollers 70 and 71 are preferably rubber-faced and respectively journaled in the ends of the side frames of an upper and lower jaw 72 and 73. The side frames of the upper jaw 72 are secured to the ends of a rock-shaft 77, secured in and connecting the corresponding parallel arms 74 74 of a bracket secured to and projecting up from the contiguous side of frame A, and the side frames of the lower jaw 73 are pivoted on a revolving shaft 76, journaled in lugs projecting laterally from arms 74, so that its axis is in the same vertical plane as that of shaft 77. Near their pivoted ends the side frames of these jaws located nearest the feed-board are provided with segmental gears that intermesh, so that the upward movement of the lower jaw will cause the upper jaw to move downward, and vice versa. Between its bearings shaft 76 has a tape-roller 78 thereon, and this roller 78 is connected by preferably a broad endless band of tape 79 to the adjustable tape-roller 80, journaled on suitable spindle 81, secured in a horizontal slot in the outer end of a bracket 82, secured to and projecting from the side frame of the machine. When rollers 70 and 71 move toward each other, they grasp the end of the wrapped paper projecting beyond the adjacent ends of the gripper-blades between them, and revolving as they do they draw the paper off said blades and onto the tape 79, by which it is carried out to roller 80 and dropped therefrom into a bag or other receptacle suitably placed to receive it.

The segmental gear at the pivoted ends of the jaws may be cast homogeneous with the side frames thereof; but I prefer to provide gear-plates 83 83, which are of a shape that permits them to be riveted or bolted to the said side frames in such manner that their segmentally-geared edges intermesh, as shown. The jaws are made to open and shut by a cam 84 on the cam-shaft K. This cam 84 has one of its sides so shaped that it engages the lower end of a vertically-disposed lever 85, which has a friction-wheel 86 thereon, if desired, and causes said lever to move. The upper end of this lever has a bolt 87 extending laterally through a suitable opening in its upper end, which bolt is pivotally connected to the lower end of an arm 88, attached to and extending down from rock-shaft 76 at right angles to jaw 73. In order that when lever 85 causes the jaws to close the motion imparted thereto may not be a positive one and said rollers 70 and 71 may adjust themselves to the thickness of the wrapped package between them, I prefer to surround the portion of the barrel of bolt 87 on the side of the lever opposite arm 88 with a coil expansion-spring 89, the pressure of which against the lever is regulated by nuts 90 on the screw-threaded unsecured end of the bolt.

Rollers 70 and 71 are each revolved so that the adjacent segments of their circumference move in the same direction by a train of gear 91, 92, and 93 for the upper roller 71, and 94, 95, and 96 for the lower roller 72. Gear 91 is secured to the extended journal of roller 71, located farthest from the feed-board. Gear 92 is an idle gear meshing with gear 91 and is journaled on a stud projecting from the rear side frame of the upper jaw, and gear 93 meshes with the idle gear 92 and is journaled on the adjacent end of the upper rock-shaft 77. Gear 94 is mounted on the extended journal of the lower roller 72, located farthest from the feed-board. 95 is an idle gear engaging the same and is journaled on a stud projecting from the rear side frame of the lower jaw, and gear 96 is the drive-gear, which meshes with gear 95 of the lower jaw and gear 93 of the upper jaw and is fast on the rear end of shaft 76. Shaft 76 is driven by a bevel-pinion 97 on its rear extremity, and the latter is engaged by a bevel-gear 98 on the shaft $M^2$, hereinbefore alluded to.

In a machine as complex as the above many changes in construction of details and many changes in those details themselves are not only possible, but very probable. All such changes I desire to be understood as contemplating as coming within the scope of my invention.

What I claim as new is—

1. The combination in a wrapping-machine, with two simultaneously-revoluble gripper-blades normally held flatwise together but separable in parallel planes to receive and release the work, of devices for feeding folded publications thereto, and devices for supplying wrappers to said blades.

2. The combination in a wrapping-machine, with two simultaneously-revoluble gripper-blades normally held flatwise together but separable in parallel planes to receive and release the work and devices for operating said blades, of devices located at one side of said grippers for feeding folded publications thereto, and devices located on the opposite side of said grippers for supplying wrappers to the same.

3. The combination in a wrapping-machine, with two simultaneously-revoluble gripper-blades normally held flatwise together but separable in parallel planes to receive and release the work, of devices for feeding folded publications thereto, devices for supplying wrappers to said grippers and devices adjacent to the unattached ends of said grippers for stripping the work therefrom.

4. The combination in a wrapping-machine, with two simultaneously-revoluble gripper-blades normally held flatwise together, but separable in parallel planes to receive and release the work, of devices for feeding folded publications thereto located in front of said grippers, and devices located to the rear of said grippers for supplying wrappers to the same, and devices adjacent to the unattached ends of said grippers for stripping the work therefrom.

5. The combination in a wrapping-machine, with two simultaneously-revoluble gripper-blades normally held flatwise together but separable in parallel planes to receive and release the work, of devices located in front of said blades for feeding folded publications thereto, an automatically vertically adjustable wrapper-platform located to the rear of said blades, devices for moving said wrappers forward one at a time, and rollers for feeding said wrappers as taken from said platform to said grippers.

6. The combination in a wrapping-machine with two simultaneously-revoluble gripper-blades normally held flatwise but separable in parallel planes to receive and release the work, of devices for actuating the same, devices located in front of said blades for feeding folded publications thereto, an automatically vertically adjustable wrapper-platform in the rear of said gripper-blades, an overhead paste-fountain reciprocal in the direction of length of said machine, and a vertically-movable paster-foot alternately taking from said paste-fountain and engaging the rear edge of the top sheet of wrappers, devices for moving said wrappers forward one at a time, and rollers for feeding the same to said grippers.

7. The combination in a wrapping-machine with two gripper-blades, substantially as described, of devices for actuating the same, endless tapes and gages in front of the same for feeding folded publications thereto an automatically vertically adjustable wrapper-platform in the rear of said gripper-blades, an overhead paste-fountain reciprocal in the direction of length of said machine, friction-rollers for moving the wrapper forward and shaft therefor journaled in front of said fountain and movable therewith, which is locked from rotation during the forward movement and revoluble during the rearward movement thereof, pasting devices for said wrappers and rollers for feeding the wrappers to said grippers.

8. The combination in a wrapping-machine with two simultaneously-revoluble gripper-blades normally held flatwise together but separable in parallel planes to receive and release the work, of devices located in front of said blades for feeding the folded publications thereto an automatically-adjustable wrapper-platform located to the rear of said blades, devices for moving said wrappers forward one at a time, rollers for feeding said wrappers as taken from said platform, to said grippers, and mechanism for temporarily stopping the forward advance of said wrappers.

9. The combination in a wrapping-machine with two simultaneously-revoluble gripper-blades, devices for actuating the same, and devices located in front of said blades for feeding the folded publications thereto, of an automatically vertically adjustable wrapper-platform, an overhead paste-fountain reciprocal in the direction of length of said machine, a vertically-movable paster-foot alternately taking paste from said paste-fountain and applying it to the rear edge of the top sheet on said platform, friction-rollers journaled in front of said paste-fountain and movable therewith which are stationary during the forward movement so as to move forward the surface wrapper on said platform, and revoluble during the rearward movement, rollers for feeding said wrappers, as taken from said platform to said grippers, and mechanism for temporarily stopping the forward advance of said wrappers.

10. In a wrapping-machine, the combination with the gripper-blades having their side edges suitably hinged at one end to a revoluble head and said revoluble head, of a cam between said head and the ends of said blades, having two studs projecting therefrom diametrically opposite each other which respectively engage one of said plates so that when said head is stationary and said cam is properly moved said blades will separate with their broad surfaces parallel to each other, as and for the purpose set forth.

11. In a wrapping-machine, the combination with the gripper-blades having their side edges suitably hinged at one end to a revoluble head, said revoluble head and a bolt passing at right angles through said blades and coil-springs thereon pressing said blades together, of a cam between said head and the ends of said blades having two studs projecting therefrom diametrically opposite each other, which respectively engage one of said plates so that when said head is stationary and said cam is properly moved said blades will separate with their broad surfaces parallel to each other, as and for the purpose set forth.

12. In a wrapping-machine, the combination with the gripper-blades having their side edges at one end hinged respectively to pintles projecting diametrically opposite each other from a head, said head and a shaft to the adjacent end of which said head is secured, of a double spool revolving first in one direction and then in the opposite, and engaging and revolving said shaft when moving in one direction but not in the other, and a cam loose on the end of said shaft and located between said head and the ends of said blades, having two studs projecting therefrom diametrically opposite each other, which, respectively engage one of said plates so that when said cam is properly turned said blades will separate with their broad surfaces parallel to each other, as and for the purpose set forth.

13. In a wrapping-machine, the combination with the gripper-blades having their side edges at one end, respectively hinged to pintles projecting diametrically opposite each other from a head, said head, and a shaft on the adjacent end of which said head is permanently fastened, of a cam loose on the extremity of said shaft between said head and the ends of said blades, having two studs projecting therefrom diametrically opposite each other which respectively engage one of said plates so that when said cam is properly turned said blades will separate with their broad surfaces parallel to each other, a double spool mounted loosely on said shaft, two straps one wound on said spool in one direction and the other in the other direction a weight pulling on one of said straps, and the other strap having its other ends suitably fastened, and between said end and spool passing around a sheave journaled to the end of a crank, said crank and shaft to the end of which said crank is secured: said spool engaging the shaft on which it is mounted when revolving in one direction, and revolving independently thereof when moving in the opposite direction.

14. In a wrapping-machine, the combination with simultaneously-revoluble gripper-blades normally flatwise together but separable in parallel planes to receive and release the work, of devices for feeding folded publications to said blades and stop mechanism for temporarily detaining the advance thereof until the proper time, and mechanism for supplying wrappers to said blades one at a time and mechanism for temporarily stopping the forward advance of said wrappers.

15. In a wrapping-machine, the combination with the simultaneously-revoluble gripper-blades, normally held flatwise together, but at proper intervals separating in parallel planes to receive and release the work, of devices for feeding folded publications to said blades, and mechanism on the opposite side of said blades for supplying wrappers one at a time thereto, and two stripping-rollers adjacent to the unattached end of said grippers normally separated but approaching each other and stripping the work from said blades when the same are stationary as and for the purpose set forth.

16. In a wrapping-machine, the combination with simultaneously-revoluble gripper-blades normally held flatwise together, but at proper intervals separating in parallel planes to receive and release the work, of devices for feeding folded publications to said blades and mechanism on the rear of said blades for supplying wrappers one at a time thereto, and two revolving stripping-rollers journaled respectively in the ends of jaws articulated at the joint, an oscillatory lever for moving the lower jaw, and cam for actuating said lever at the proper time, as and for the purpose set forth.

17. In a wrapping-machine, the combination with a rock-shaft having a series of fingers, a platform having a depending rack, a pinion on a transverse shaft, a ratchet on the shaft, a bell-crank loose on the end of the shaft with its vertical branch terminating in a head with a curved edge of slightly-greater radius than the ratchet, a pawl engaging the ratchet, an oscillating arm, a pawl thereon intermittently engaging the ratchet, and a connection from the rock-arm to the bell-crank, for controlling the action of the last-named pawl, means for distributing paste on wrappers supported on the platform, gripper-blades and mechanism for supplying the wrappers and folded publications to said blades.

18. In a wrapping-machine, a vertical adjustable wrapper-platform, means for intermittently elevating same, a paste-fountain, a transverse shaft in front of the paste-fountain, rollers on the shaft, means for preventing the rotation of the shaft as the paste-fountain moves forward, said shaft being free to rotate on the rearward movement of the paste-fountain, mechanism for directing the rollers to the surface of the top wrapper, wrapping mechanism and means for supplying folded publications and wrappers thereto.

19. In combination with a paste-fountain, paster-roll, trams connected to the paste-fountain, a paster-foot, suitable connection between the paster-foot and trams whereby said paster-foot is vertically reciprocated, a platform for supporting wrappers, means for automatically elevating the platform, means carried by the paste-fountain for removing the top sheet after paste has been applied, wrapping mechanism and conveyers for delivering the folded publications and wrappers.

20. In combination, a paste-trough and a paste-roller carried thereby, means for reciprocating the paste-trough, trams carried thereby, a paster-foot having connections with trams whereby said foot is moved vertically, a shaft carrying frictional rollers also carried by the paste-trough, a platform for supporting wrappers, and means for directing the friction-rolls into contact with the top wrapper, wrapping mechanism and conveyers for delivering wrappers and folded publications to the wrapping mechanism.

21. In a wrapping-machine, a reciprocating paste-fountain, a paster-foot, means on the paste-fountain for moving the paster-foot vertically, a wrapper-support, means connected with the paste-fountain for removing the wrappers, wrapping mechanism and conveyers for delivering folded publications and wrappers to the wrapping mechanism.

22. In combination, a paste-fountain carrier, a paste-roller, and a paster-foot, a paster-head from which the paster-foot is adjustably suspended, trams carried by the paste-trough, travelers at each end of the paster-head engaging said trams, means for supporting wrappers to receive the paste from the paster-foot, mechanism for removing the wrappers and conveying them to suitable wrapping mechanism.

23. In combination, the paste-fountain and means for reciprocating it, trams moving with the paste-fountain, a paster-head having rolls engaging the trams, a paster-foot adjustably secured to the paster-head, a wrapper-support, means for removing the wrapper from the support, a rock-shaft suitably operated controlling the means, wrapping mechanism and conveyers for delivering wrappers and folded publications to the wrapping mechanism.

24. In combination, a reciprocating paste-fountain, a platform for containing wrappers, means for transferring paste from the paste-fountain to the top wrapper on the platform, a shaft carried by the paste-fountain, friction-rollers on the shaft for feeding the top wrapper, pawls for preventing the rotation of the shaft on the forward movement of the paste-fountain.

25. In combination, a reciprocating paste-fountain, a platform for containing wrappers, means for transferring paste from the paste-fountain to the top wrapper on the platform, a shaft carried by the paste-fountain, friction-rollers on the shaft for feeding the wrappers, ratchet and pawls, an arm having a rearwardly-extending horizontal portion engaging the shaft whereby the arm controls the plane of the shaft.

TIMOTHY STEBBINS.

Witnesses:
LOUIS S. THOMASON,
FRANK D. THOMASON.